(12) United States Patent
Kosugi et al.

(10) Patent No.: US 11,102,019 B2
(45) Date of Patent: Aug. 24, 2021

(54) DEVICE, METHOD, AND SYSTEM FOR MANAGED UPDATING OF MEETING HANDOUT DATA

(71) Applicant: LENOVO (Singapore) PTE. LTD., New Tech Park (SG)

(72) Inventors: Kazuhiro Kosugi, Yokohama (JP); Daisaku Morita, Yokohama (JP); Nozomi Mandokoro, Yokohama (JP); Takumi Imai, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 171 days.

(21) Appl. No.: 16/416,673

(22) Filed: May 20, 2019

(65) Prior Publication Data

US 2019/0386839 A1     Dec. 19, 2019

(30) Foreign Application Priority Data

Jun. 13, 2018    (JP) .............................. JP2018-112826

(51) Int. Cl.
*G06F 15/16* (2006.01)
*H04L 12/18* (2006.01)
*G06F 9/50* (2006.01)

(52) U.S. Cl.
CPC ........ *H04L 12/1818* (2013.01); *G06F 9/5016* (2013.01); *G06F 9/5022* (2013.01); *H04L 12/1827* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 2010/0153160 A1* | 6/2010 | Bezemer ............ | G06Q 10/0631 705/7.12 |
| 2015/0193739 A1* | 7/2015 | Min .................... | G06Q 10/1095 705/7.19 |
| 2016/0170385 A1* | 6/2016 | Chen ..................... | G05B 15/02 700/275 |

FOREIGN PATENT DOCUMENTS

| JP | 083148149 A | 11/1996 |
|---|---|---|
| JP | 2011215879 A | 10/2011 |
| JP | 2015043149 A | 3/2015 |
| JP | 2015-103131 A | 6/2015 |
| JP | 2015103131 A | 6/2015 |
| JP | 2017174276 A | 9/2017 |

* cited by examiner

*Primary Examiner* — Normin Abedin
(74) *Attorney, Agent, or Firm* — Kunzler Bean & Adamson

(57) ABSTRACT

An apparatus for managed updating of meeting handout data is disclosed. A method and system also perform the functions of the apparatus. An apparatus is disclosed that, in one embodiment, includes an acquisition unit that acquires from a server, meeting information and meeting handout data for a meeting, and stores the acquired meeting information and meeting handout data to a storage area in a memory unit of a meeting device. The apparatus also includes an authentication unit that authenticates a participating terminal to participate in the meeting; and a management unit that, after authenticating the participating terminal, changes a locator for the meeting handout data that the participating terminal acquires from a storage place of the server to the storage area in the memory unit of the meeting device.

20 Claims, 6 Drawing Sheets

MEETING-REGISTRATION IMAGE

| MEETING NAME | | 🔍 |
| DATE AND TIME | | 🔍 |
| LOCATION | | 🔍 |
| HANDOUT | | 🔍 |
| PARTICIPANTS | | 🔍 |

MEETING-INFORMATION IMAGE

MEETING NAME
　**MEETING
DATE AND TIME
　// :-:**
PARTICIPANTS
　  **
HANDOUT
　[click] — B1

[PARTICIPATE IN THE MEETING] — B2
[END THE MEETING] — B3

MEETING INFORMATION

| MEETING NAME | MEETING ID | STORAGE PLACE URL | DATE AND TIME | LOCATION | PARTICI-PANTS | CREDEN-TIALS |
|---|---|---|---|---|---|---|
|  MEETING | * | http://*/* | // |  | *, *, * | ** |
|  PRELIMINARY MEETING | * | http://*/* | // |  | *, *, * | ** |
|  MEETING | * | http://*/* | // |  | *, *, * | ** |

G

INVITATION INFORMATION

| MEETING NAME | MEETING ID | STORAGE PLACE URL (1) | STORAGE PLACE URL (2) | PARTICIPANT NAME | CREDEN-TIALS | AP INFORMATION |
|---|---|---|---|---|---|---|
| ** MEETING | *** | http://*/* | http://*/* | * | ** | ** |

H

DEVICE, METHOD, AND SYSTEM FOR MANAGED UPDATING OF MEETING HANDOUT DATA

FIELD

The subject matter disclosed herein relates to online meeting systems and more particularly relates to a device, method, and system for managed updating of meeting handout data.

BACKGROUND

Some systems for distributing meeting handouts over a network store meeting handout data for distribution to a plurality of participant terminals in advance. In such systems, if a meeting participant such as a presenter attempts to update information of the meeting handout shortly before or during the meeting, the meeting participant typically communicates the updated information verbally or indicates that the online handout will be updated after the meeting. Other meeting participants may use outdated meeting handout data for several reasons including that reasons that verbally communicated updates made during the meeting are not reflected in the handout, outdated handout information is already downloaded by the other meeting participants prior to the attempted update taking place, the meeting ends and the updated information never gets uploaded by the presenter and/or downloaded by the other meeting participants.

SUMMARY

An apparatus for managed updating of meeting handout data is disclosed. A method and system also perform the functions of the apparatus. An apparatus is disclosed that, in one embodiment, includes an acquisition unit that acquires from a server, meeting information and meeting handout data for a meeting, and stores the acquired meeting information and meeting handout data to a storage area in a memory unit of a meeting device. The apparatus also includes an authentication unit that authenticates a participating terminal to participate in the meeting; and a management unit that, after authenticating the participating terminal, changes a locator for the meeting handout data that the participating terminal acquires from a storage place of the server to the storage area in the memory unit of the meeting device.

In some embodiments, prior to the participating terminal being authenticated, the management unit reserves the storage area in the memory unit of the meeting device to store the meeting handout data based on the meeting information. In certain embodiments, the management unit sets a capacity of the storage area in the memory unit in accordance with a size of the meeting handout data. In various embodiments, the acquisition unit stores the meeting handout data acquired from the storage place of the server to the storage area in the memory unit. In some embodiments, the acquisition unit stores the meeting handout data acquired from the server in the storage area in the memory unit at a predetermined time before a starting time of the meeting.

In various embodiments, the acquisition unit stores the meeting handout data acquired from server to the storage area in the memory unit after a starting time of the meeting. In certain embodiments, the management unit creates a schedule for downloading the meeting handout data sufficient to enable the downloading to be performed by a scheduled starting time of the meeting. In one embodiment, the management unit transmits updated meeting handout data that is updated in the memory unit of the meeting device during the meeting to the server. In certain embodiments, the management unit updates the meeting handout data stored in a predetermined storage area of the server based on meeting handout data that is updated in the memory unit. In some embodiments, the management unit deletes the meeting handout data from the memory unit, in response to the meeting ending.

A method for managed updating of meeting handout data is disclosed. In one embodiment, the method acquires from a server, meeting information and meeting handout data for a meeting. The method stores the acquired meeting information and meeting handout data to a storage area in a memory unit of a meeting device of the meeting device, authenticates a participating terminal to participate in the meeting, and changes, after authenticating the participating terminal, a locator for the meeting handout data from a storage place of the server to the storage area in the memory unit.

In some embodiments, the method also reserves, prior to the participating terminal being authenticated, sufficient storage area in the memory unit of the meeting device to store the meeting handout data based on the meeting information. In certain embodiments the method further stores the meeting handout data acquired from the server to the storage area in the memory unit. In some embodiments, the method stores the meeting handout data acquired from the server in the storage area in the memory unit of the meeting device at a predetermined time before a starting time of the meeting.

In various embodiments, the method stores the meeting handout data acquired from the server in the storage area in the memory unit of the meeting device after a starting time of the meeting. In some embodiments, the method creates a schedule for downloading the meeting handout data sufficient to enable the downloading to be performed by a starting time of the meeting. In various embodiments, the method updates, during the meeting, the meeting handout data stored to the storage area in the memory unit to produce updated meeting handout data, and transmits the updated meeting handout data to the server.

In certain embodiments the method stores updated meeting handout data stored in a predetermined storage area of the server based on the meeting handout data that is updated in the storage area of the memory unit. In one embodiment, the method deletes the meeting handout data from the memory unit of the meeting device, in response to the meeting ending.

A system for managed updating of meeting handout data is disclosed. In one embodiment, the system includes a participating terminal configured to participate in a meeting, a server that stores meeting handout data to be used in the meeting; and a meeting device. The meeting device is configured to acquire meeting information and the meeting handout data from the server, store the acquired meeting information and meeting handout data in a storage area of the memory unit, authenticate the participating terminal, and after authenticating the participating terminal, change a locator for the meeting handout data from a storage place of the server to the storage area in the memory unit.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which:

FIG. 3 is a schematic block diagram illustrating one embodiment of a meeting registration display image for a meeting with managed updating of meeting handout data;

FIG. 4 is a schematic block diagram illustrating one embodiment of a meeting information display image for a meeting with managed updating of meeting handout data;

DETAILED DESCRIPTION

[System Configuration]

Figure 1:
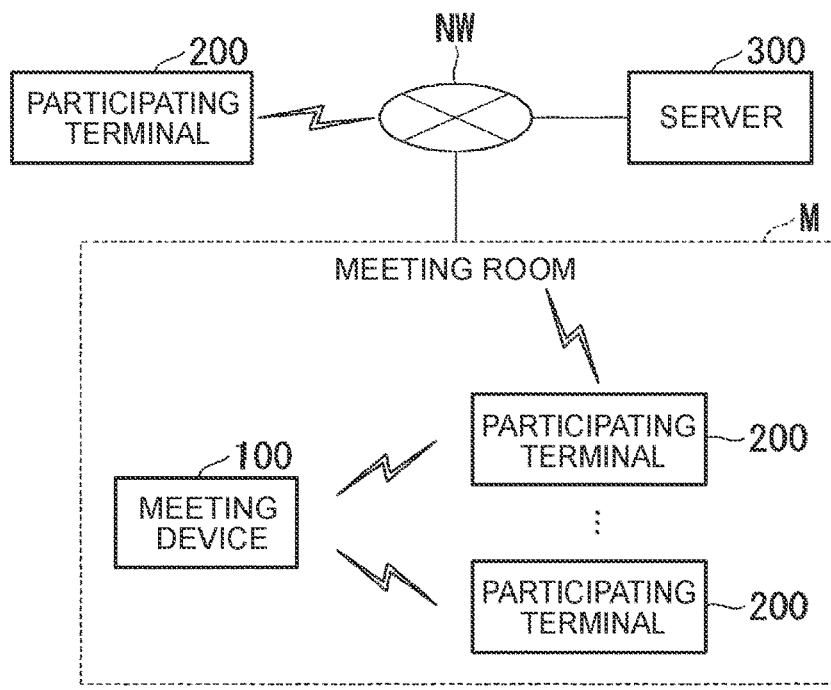
FIG. 1 is a schematic block diagram illustrating one embodiment of a meeting system for managed updating of meeting handout data.

FIG. 1 is a schematic block diagram illustrating one embodiment of a meeting system 1 for managed updating of meeting handout data. In one embodiment, the meeting system 1 includes a meeting device 100, one or more participating terminals 200, and a server 300. The meeting system 1 displays meeting handout data on the one or more participating terminals 200, and updates the meeting handout data.

In one embodiment, the meeting device 100, the one or more participating terminal 200, and the server 300 are connected via a network NW. In certain embodiments, the one or more participating terminals 200 connect to the meeting device 100 via wireless LAN (Local Area Network) and not via the network NW in a meeting room M.

In one embodiment, the meeting device 100 is installed in a meeting room M. In various embodiments, the meeting device 100 serves as an access point of wireless LAN in the meeting room M to communicate with the one or more participating terminals 200. The meeting device 100 manages various types of information, such as information on the meeting, information on the participants of the meeting, and a meeting handout used in the meeting.

In various embodiments, the meeting device 100 includes a memory unit to store data of the meeting handout to be shared by the one or more participating terminals 200 in the meeting. In some embodiments, the meeting handout include data for documents, sound, images, and videos or information created by combining one or more of these data. The meeting device 100 accesses the server 300 to acquire the meeting handout to be used in the meeting before the meeting, and stores this in the memory unit. In one embodiment, the meeting device 100 refers to a meeting schedule for the meeting and acquires the meeting handout a predetermined time before the starting time of the meeting. For example, in one embodiment, the predetermined time is 10 minutes before the meeting. In various embodiments, any value for the predetermined time is set by the participants.

In certain embodiments, the meeting device 100 accesses the server 300 not only before the meeting but also after the starting of the meeting to acquire the meeting handout to be used in the meeting, and stores the meeting handout data in the memory unit. In some embodiments, the meeting device 100 acquires the meeting handout at timing when at least one of the participants is authenticated. In various embodiments, the meeting device 100 accesses the server 300 not only before the meeting but also during the meeting to acquire the meeting handout to be used in the meeting, and store this in the memory unit. In one example, the meeting device 100 refers to the schedule and accesses the server 300 at predetermined timing in the time zone of the meeting being held to acquire the meeting handout. In certain embodiments, the predetermined timing is predetermined time intervals or any timing in response to the operation by a participant.

In one example, the meeting device 100 compares the current meeting handout with the handout before the meeting. In various embodiments, when the handout is updated or includes additional information, the meeting device 100 stores the new meeting handout in a different folder of the memory unit, and informed the participants of the meeting as such. To this end, the meeting device 100 sends a mail to the participants, informs a display unit 204 of each of the participating terminals 200 via an application program on the meeting that is installed in the participating terminal 200, or displays as such on a display in the meeting room. Through this procedure, the meeting device 100 can provide the latest meeting handout to the participants even when a participant who is not able to participate in the meeting uploads a new handout to the server 300 during the meeting.

In certain embodiments, when the meeting device 100 operates in the meeting room M, the meeting device 100 wirelessly communicates with the one or more participating terminals 200 to provide data of the meeting handout stored in the memory unit to the participating terminals 200. This allows the meeting system 1 to speedily provide the meeting handout in the meeting room M.

In one embodiment, the participating terminals 200 are devices that speakers and participants of the meeting operate. That is, the speakers and the participants of the meeting use the one or more participating terminals 200 to participate in the meeting. Each participating terminal 200 has a function of sending the input meeting-setting information to the server 300 to set up a meeting, and participating in the meeting.

In various embodiments, each participating terminal 200 is an information processing device, such as a PC (personal computer). In some embodiments, the participating terminals 200 are portable information terminals, such as a tablet, a smart phone, a mobile phone and a personal digital assistant ("PDA").

In one embodiment, the server 300 is a server unit to provide a cloud service via the network NW. In one example, the server 300 is an information processing device, such as a PC. Based on the meeting-setting information received from the participating terminals 200, the server 300 sets up the meeting. Based on the meeting-setting information, the server 300 creates meeting information G and sets a meeting schedule. Based on the meeting information G, the server 300 creates invitation information H described later that is an invitation card containing information necessary to participate in the meeting, and sends the invitation information H to a plurality of participants of the meeting. In various embodiments, the network NW includes a part or the entire of WAN (Wide Area Network), LAN, the internet, a dedicated line, a wireless base station and a provider.

In various embodiments, the systems, apparatuses, and methods described herein, solve the problems of existing systems in which meeting participants may be using outdated meeting handout data for several reasons including that reasons that verbally communicated updates made during the meeting are not reflected in the handout, outdated handout information is already downloaded by the other meeting participants prior to the attempted update taking place, the meeting ends and the updated information never gets uploaded by the presenter and/or downloaded by the other meeting participants.

The systems, apparatuses, and methods described herein provide various structures and functions for managed updating of meeting handout data that allow users to share and update information at predetermined times before or after the meeting has started and to ensure that the updated meeting handout data is shared to other participating terminals. Thus, the systems apparatuses and methods described herein improve electronic meeting technology.

[Configuration of Each Device]

Figure 2:
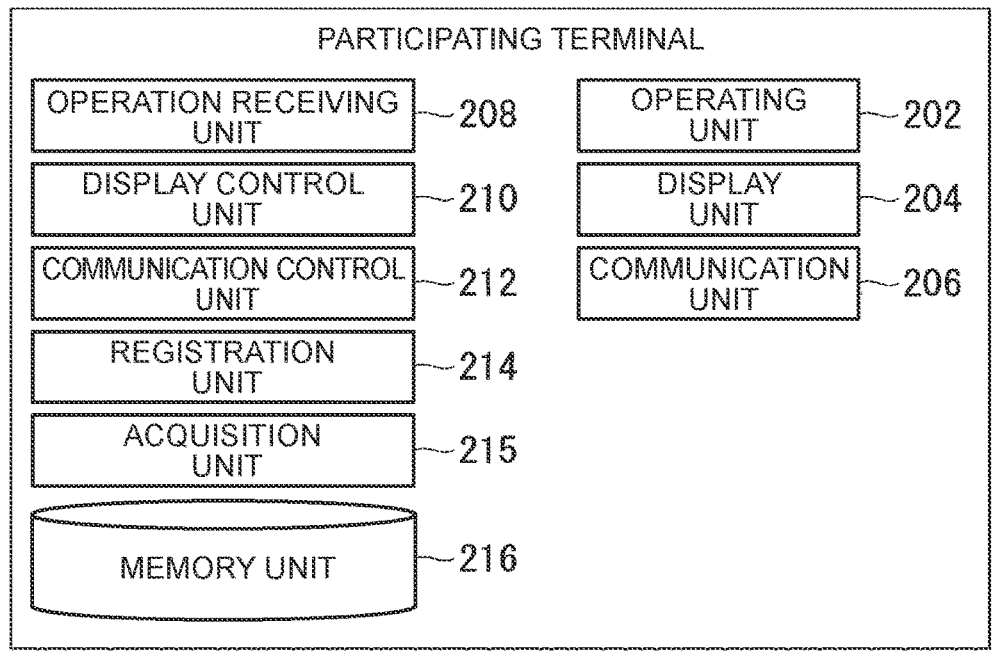
FIG. 2 is a schematic block diagram illustrating one embodiment of a participating terminal for participating in a meeting with managed updating of meeting handout data.

FIG. 2 is a schematic block diagram illustrating one embodiment of a participating terminal 200 for participating in a meeting with managed updating of meeting handout data. The participating terminal 200 receives an operation by a user to set up the meeting before the meeting, and sends the meeting-setting information including information on the details of the meeting to the server 300. The participating terminal 200 uploads a meeting handout to the server 300 before the meeting.

In the meeting room M to hold the meeting, each participating terminal 200 connects to the meeting device 100 via a communication, such as wireless LAN, and accesses a meeting handout stored in the meeting device 100. The one or more participating terminals 200 shares the meeting handout via the meeting device 100 during the meeting. Each participating terminal 200 receives the input operation from the user to update the meeting handout.

In one example, each participating terminal 200 includes an operating unit 202, a display unit 204, a communication unit 206, an operation receiving unit 208, a display control unit 210, a communication control unit 212, a registration unit 214, an acquisition unit 215, and a memory unit 216.

In one example, the operation receiving unit 208, the display control unit 210, the communication control unit 212, the registration unit 214, and the acquisition unit 215 are implemented when a processor, such as CPU (Central Processing Unit), executes a program (software). In various embodiments, these functional units are implemented by hardware, such as a LSI (Large Scale Integration), an ASIC (Application Specific Integrated Circuit), or a FPGA (Field-Programmable Gate Array), or are implemented through the cooperation of software and hardware.

The operating unit 202 receives the operation by the user. In one embodiment, the operating unit 202 is a keyboard, a mouse, or a graphical user interface ("GUI") key on an input screen displayed on the display unit 204. The display unit 204 includes a display, a speaker and the like, to distribute information with videos, images, texts, and sound. In one example, the display unit 204 is a liquid crystal display or a touch panel.

In certain embodiments, the communication unit 206 communicates with a device other than the participating terminals 200 via a cellular network, a LAN (Wi-Fi (registered trademark)) network, Bluetooth (registered trademark), DSRC (Dedicated Short Range Communication), or the like, or communicates with the server 300 via the network NW. The communication unit 206 includes a network interface card (NIC) that is used for a wired connection with the network NW. In one example, the communication unit 206 communicates with the meeting device 100 via wireless LAN in the meeting room M to hold the meeting.

In one example, the operation receiving unit 208 receives inputting of the meeting-setting information through a user's operation with an input image, such as a meeting-registration image IM1, displayed on the display unit 204, and receives updating of a meeting handout or uploading to the server 300.

FIG. 3 is a schematic block diagram illustrating one embodiment of a meeting registration display image IM1 for a meeting with managed updating of meeting handout data. In one example, the display control unit 210 displays the meeting-registration image IM1 on the display unit 204 in accordance with the user's operation. In one embodiment, the meeting-registration image IM1 includes input fields to input information, such as the name of the meeting, the date and time of the meeting, the location of the meeting, the place to store a meeting handout, and the participants. In some embodiments, the meeting-registration image IM1 includes search buttons that are adjacent to the input fields to search for the inputting. Clicking of a search button changes the image into another image of a schedule, for example. In various embodiments, a user then selects the date and time and the location of the meeting to input information in the input fields.

In certain embodiments, the display control unit 210 displays a meeting-information image IM2 (see FIG. 4) showing the information on the meeting on the display unit 204 in accordance with the invitation information H (see FIG. 7) transmitted from the server 300.

In one embodiment, when the meeting device 100 and the participating terminal 200 communicate with each other in the meeting room M to hold the meeting, the display control unit 210 controls the display unit 204 to display an image of a folder corresponding to the storage area for the meeting handout in the memory unit 120 of the meeting device 100. When the meeting device 100 and the participating terminal 200 do not communicate with each other, the display control unit 210 controls the display unit 204 to display an image of a folder corresponding to the storage area for the meeting handout in a memory unit 320 of the server.

When the user clicks an icon for the meeting handout on an image of a folder to store the meeting handout, the display control unit 210 controls the display unit 204 to display the contents of the meeting handout. Displaying the contents on the display unit 204 includes the displaying of documents and images as well as replaying videos and sound.

In various embodiments, the communication control unit 212 controls the communication unit 206 to communicate with another device via the network NW or to communicate with the meeting device 100 via wireless LAN.

In one embodiment, the registration unit 214 transmits the meeting-setting information that is input in accordance with the meeting-registration image IM1 displayed on the display unit 204 to the server 300. The registration unit 214 uploads a meeting handout to a predetermined storage place in the server 300 in accordance with the user's operation.

In certain embodiments, acquisition unit 215 acquires the invitation information H described later to participate in the meeting from the server 300 via an email, for example. In one example, the acquisition unit 215 acquires a meeting handout in accordance with the user's operation with the meeting-information image IM2.

In one embodiment, when the meeting device 100 and the participating terminal 200 communicate with each other in the meeting room M to hold the meeting, the acquisition unit 215 acquires the data of the meeting handout from the storage area for the meeting handout in the memory unit 120 of the meeting device 100, and stores the acquired data in the memory unit 216. In one example, in response to the user's operation to acquire a meeting handout, the acquisition unit 215 stores data of the meeting handout in the memory unit 216, or temporarily stores the data of the meeting handout in the memory unit 216 to display the data on the display unit 204.

The memory unit 216, in some embodiments, is a non-volatile memory to store programs and data. In one example, the memory unit 216 is a memory, such as a flash memory or a Hard Disk Drive ("HDD").

FIG. 4 is a schematic block diagram illustrating one embodiment of a meeting information display image IM2 for a meeting with managed updating of meeting handout data. In one embodiment, the meeting-information image IM2 contains displayed information, such as the name of the meeting, the date and time of the meeting, and the participants. The meeting-information image IM2 also contains displayed images, such as an operating button B1 to display the place to store the meeting handout, an operation button B2 to start the participation in the meeting, and an operating button B3 to determine the ending of the meeting.

In various embodiments, when the user clicks the operating button B1, the display unit 204 displays a website (e.g., an image of a folder) storing the meeting handout and indicated with the linked Uniform Resource Locator ("URL"). In one example, when the user clicks the operating button B2, the registration unit 214 transmits information, such as the participant ID, the password, and the password to connect to the access point, to the meeting device 100. In one example, when the user clicks the operating button B3, the registration unit 214 sends information to end the meeting to the meeting device 100.

Figures 5, 6:
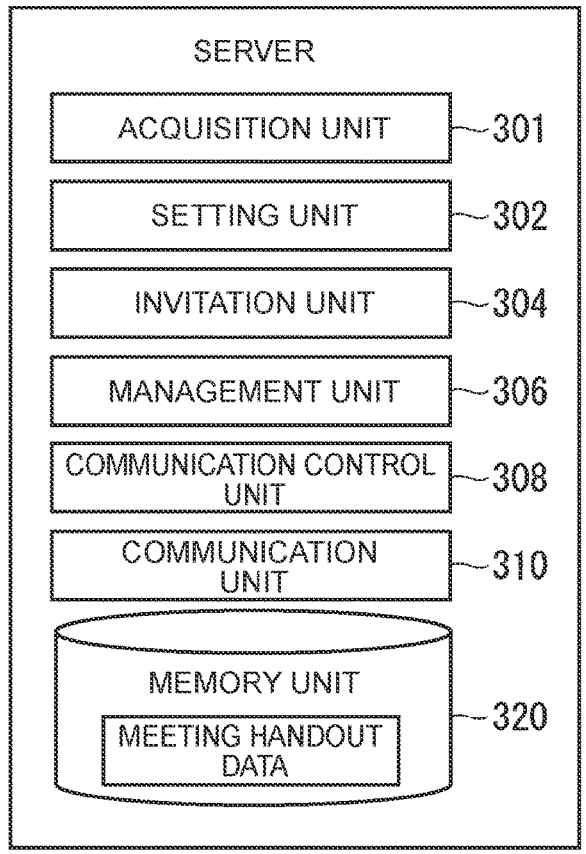
FIG. 5 is a schematic block diagram illustrating one embodiment of a server used for a meeting with managed updating of meeting handout data.
FIG. 6 is a schematic block diagram illustrating one embodiment of meeting information data for a meeting with managed updating of meeting handout data.

FIG. 5 is a schematic block diagram illustrating one embodiment of a server 300 used for a meeting with managed updating of meeting handout data. In one embodiment, the server 300 includes an acquisition unit 301, a setting unit 302, an invitation unit 304, a management unit 306, a communication control unit 308, a communication unit 310, and a memory unit 320.

In various embodiments, the acquisition unit 301, the setting unit 302, the invitation unit 304, the management unit 306, and the communication control unit 308 are implemented when a processor, such as CPU, executes a program. In some embodiments, these functional units are implemented by hardware, such as a LSI, an ASIC, or a FPGA, or are implemented through the cooperation of software and hardware.

In one embodiment, the acquisition unit 301 acquires meeting-setting information and data of a meeting handout from the participating terminals 200. The acquisition unit 301 stores the acquired meeting-setting information and data of the meeting handout in a predetermined storage area (also referred to as a storage place) in the memory unit 320.

In certain embodiments, the setting unit 302 creates meeting information G based on the meeting-setting information stored in the memory unit 320 to set up a meeting. The setting unit 302 transmits the meeting information G to the meeting device 100.

FIG. 6 is a schematic block diagram illustrating one embodiment of meeting information G for a meeting with managed updating of meeting handout data. In one embodiment, the meeting information G contains information, such as the date and time of the meeting, the location of the meeting, the name of the meeting, the participants, and credentials as well as information on the URL for the place to store the meeting handout. In one example, the meeting-information G contains information, such as the date and time of the meeting, the participants, and the URL for the place to store the meeting handout. In one example, the meeting information G is created with an identification code (e.g., GUID) to identify the meeting. The credentials include IDs and passwords to identify the participants, and are used to authenticate a participant when the participant requests an access to the meeting handout.

The meeting information G, in some embodiments, associates the meeting ID and the place to store the meeting handout. The meeting information G therefore specifies the place to store the meeting handout to be used for the meeting. In one example, the place to store the meeting handout is a shared folder to which participants of the meeting are allowed to access.

In one embodiment, the invitation unit 304 creates invitation information H associated with the corresponding meeting based on the meeting information G. The invitation information H is transmitted to the participants. The invitation information H is used as an invitation card to let the participants participate in the meeting.

Figures 7, 8:
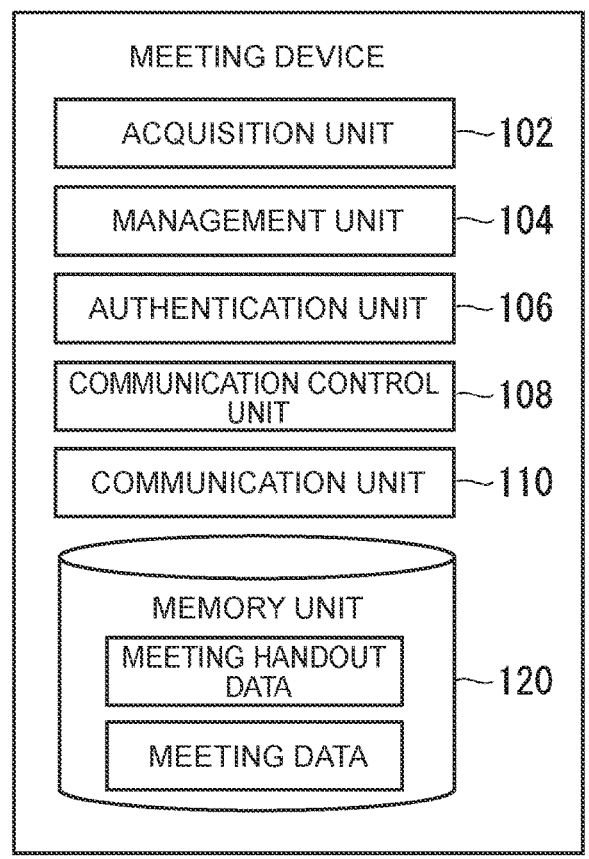
FIG. 7 is a schematic block diagram illustrating one embodiment of meeting invitation data for a meeting with managed updating of meeting handout data.
FIG. 8 is a schematic block diagram illustrating one embodiment of an apparatus that includes a meeting device for managed updating of meeting handout data.

FIG. 7 is a schematic block diagram illustrating one embodiment of invitation information H for a meeting with managed updating of meeting handout data. In one example, the invitation information H contains information, such as the URL for meeting information, the name of the meeting, the meeting ID, the URL for storage place, the names of participants, credentials, and access point ("AP") information. The URL for meeting information indicates the linked URL to the website to display the details of the meeting.

In certain embodiments, information on the URL for storage place indicates the URL of a folder to store the meeting handout, and includes information on the two URLs, including the URL of the storage place in the memory unit 320 of the server 300 and the URL of the storage area created in the memory unit 120 of the meeting device 100. In one example, the credentials contain information on the ID assigned to the participant and the password. In some embodiments, the AP information contains the service set identifier ("SSID") and the password when the meeting device 100 operates as an access point of wireless LAN.

The invitation unit 304 controls the communication control unit 308 to transmit the invitation information H to a plurality of participants who are scheduled to participate in the meeting a predetermined time before the meeting via email, for example. Ingress embodiments, a user sets any value for the predetermined time. The invitation unit 304 also controls the communication control unit 308 to transmit the meeting information G to the meeting device 100 as well.

The management unit 306 transmits the meeting handout to the URL of the storage area in response to a request for the meeting handout from the acquisition unit 102 of the meeting device 100. Receiving an access from each participating terminal 200, the management unit 306 permits the access to the place storing the meeting handout.

In one embodiment, the management unit 306 authenticates the participant based on the ID and the password of the participant transmitted from the participating terminal 200 to permit the participating terminal 200 to access the place storing the meeting handout, and transmits the data of the meeting handout to the participating terminal 200.

In various embodiments, the communication control unit 308 controls the communication unit 310 to communicate with another device via the network NW.

In one embodiment, the memory unit 320 is a non-volatile memory to store programs and data. In one example, the memory unit 320 is a memory, such as a flash memory or a HDD, in the server 300. In one embodiment, instead of having the memory unit 320 in the server 300, the memory unit 320 is an external memory or another device connected via the network NW.

FIG. 8 is a schematic block diagram illustrating one embodiment of an apparatus that includes a meeting device 100 for managed updating of meeting handout data. In one embodiment, the meeting device 100 includes an acquisition unit 102, a management unit 104, an authentication unit 106, a communication control unit 108, a communication unit 110, and a memory unit 120. In one example, the acquisition unit 102, the management unit 104, the authentication unit 106 and the communication control unit 108 are implemented when a processor, such as CPU, executes a program. In certain embodiments, these functional units are implemented by hardware, such as a LSI, an ASIC, or a FPGA, or are implemented through the cooperation of software and hardware.

In some embodiments, the acquisition unit 102 acquires the meeting information G containing information on the meeting from the server 300. In one example, when acquiring the meeting information G, the management unit 104 reserves a resource for the meeting. In one example, the resource for the meeting is a storage area associated with the meeting ID, and the storage area is created in the memory unit 120. In one example, the management unit 104 creates a shared folder associated with the storage area, and gives the name of the meeting to the created shared folder.

The management unit 104, in various embodiments, refers to the place indicated with the linked URL and storing the meeting information G, and calculates the volume of the meeting handout stored in the memory unit 320 of the server 300. The management unit 104 configures a storage area having the capacity equal to or more than the volume of the meeting-handout data based on the calculated volume of the data, and reserves the storage area in association with the meeting ID in the memory unit 120 in advance.

In certain embodiments, the management unit 104 creates a schedule to download the meeting handout from the server a predetermined time before the starting of the meeting. In one example, the management unit 104 sets the predetermined time based on the communication speed between the server 300 and the meeting device 100, and the data volume of the meeting handout. Based on the meeting information G, the management unit 104 creates the schedule so that the downloading of the meeting-handout data ends by the starting time of the meeting at the latest.

In one embodiment, the acquisition unit 102 requests the meeting handout stored in the storage place corresponding to the meeting ID from the server 300 a predetermined time before the meeting in accordance with the download schedule created by the management unit 104. The acquisition unit 102 acquires the meeting handout from the server 300 the predetermined time before the date and time to start the meeting, and stores the acquired data in the storage area corresponding to the meeting ID that is created in the memory unit 120.

In various embodiments, the management unit 104 creates the URL for the storage area in accordance with the meeting information G. When authenticating a participating terminal 200 in the meeting room M, the management unit 104 changes the storage place of the meeting handout that the participating terminal 200 accesses from the URL in the server 300 to the URL of the shared folder created in the memory unit 120. That is, the management unit 104 changes the place storing the meeting handout that the participating terminal 200 accesses from the storage place in the server 300 to the storage area in the memory unit of the meeting device 100.

In certain embodiments, after the communication between the meeting device 100 and a participating terminal 200 starts, the participating terminal 200 operates to display the storage place of the meeting handout. In such embodiments, the management unit 104 connects the participating terminal 200 to the URL of the storage area corresponding to the meeting ID that is created in the memory unit 120 of the meeting device 100.

In one embodiment, the management unit 104 gives an instruction to the acquisition unit 102 to manage the timing to acquire the meeting handout from the server 300 or the timing to upload the updated meeting handout to the server 300. In some embodiments, the management unit 104 also manages the meeting device 100 regarding the meeting schedule and the participants in accordance with the meeting information G. The management unit 104 manages the schedule to acquire the meeting handout in accordance with the meeting ID. In accordance with the schedule, the management unit 104 makes the communication control unit 108 transmit the data of the meeting handout to the participating terminals 200 at predetermined timing.

In various embodiments, after acquiring the meeting handout, the management unit 104 compares the meeting handout stored in the memory unit 120 with the meeting handout stored in the server 300 at any timing before the meeting. If the meeting handout stored in the server 300 is updated, the management unit 104 gives, in some embodiments, an instruction to the acquisition unit 102 to update the meeting handout stored in the memory unit 120.

The management unit 104 determines that the meeting ends in accordance with the operation with the participating terminal 200. After that, the management unit 104 uploads the updated data of the meeting handout to the server 300. After uploading the updated meeting handout to the server 300, the management unit 104 deletes the data of the meeting handout from the memory unit 120. At this time, the management unit 104, in some embodiments, deletes the shared folder storing the data of the meeting handout as well. For example, the management unit 104 deletes the meeting handout from the memory unit 120 at least at timing when a storage area to be used for another meeting is reserved.

In one embodiment, the authentication unit 106 authenticates a participating terminal 200 that a participant brings in the meeting room M with the ID and the password acquired from the participating terminal 200. The authentication unit 106, in certain embodiments, performs authentication by another scheme as long as it authenticates the participating terminals 200. In some embodiments, when the authentication unit 106 authenticates a participating terminal 200, the authentication unit enables a communication between the communication unit 110 and the participating terminal via wireless LAN. After authenticating the participating terminal 200, the authentication unit 106 permits the participating terminal 200 to access the storage area.

The communication control unit 108, in one embodiment, controls the communication unit 110 to control a wireless or wired connection between the meeting device 100 and the outside. The communication unit 110 communicates with a device other than the meeting device 100, and communicates with the server 300 via the network NW. The communication unit 110 includes a NIC to connect to the network NW.

In certain embodiments, the communication unit 110 communicates via a cellular network, a wireless LAN network, Bluetooth, DSRC or the like. In one example, the communication unit 110 communicates with a participating terminal 200 via wireless LAN in the meeting room M to hold the meeting.

In one embodiment, the communication unit 110 serves as an access point of wireless LAN in the communication with the participating terminal 200 via the wireless LAN. In some embodiments, the communication unit 110 communicates with the participating terminals 200 via a wired connection, instead of a wireless communication.

In one embodiment, the communication control unit 108 controls the communication unit 110 to communicate with another device via the network NW or to communicate with the one or more participating terminals 200 via wireless LAN.

In some embodiments, the memory unit 120 is a non-volatile memory to store programs and data. In one example, the memory unit 120 is a memory, such as a flash memory or a HDD. In various embodiments, the memory unit 120 is an external memory.

[Operation of Meeting System]

Figure 9:
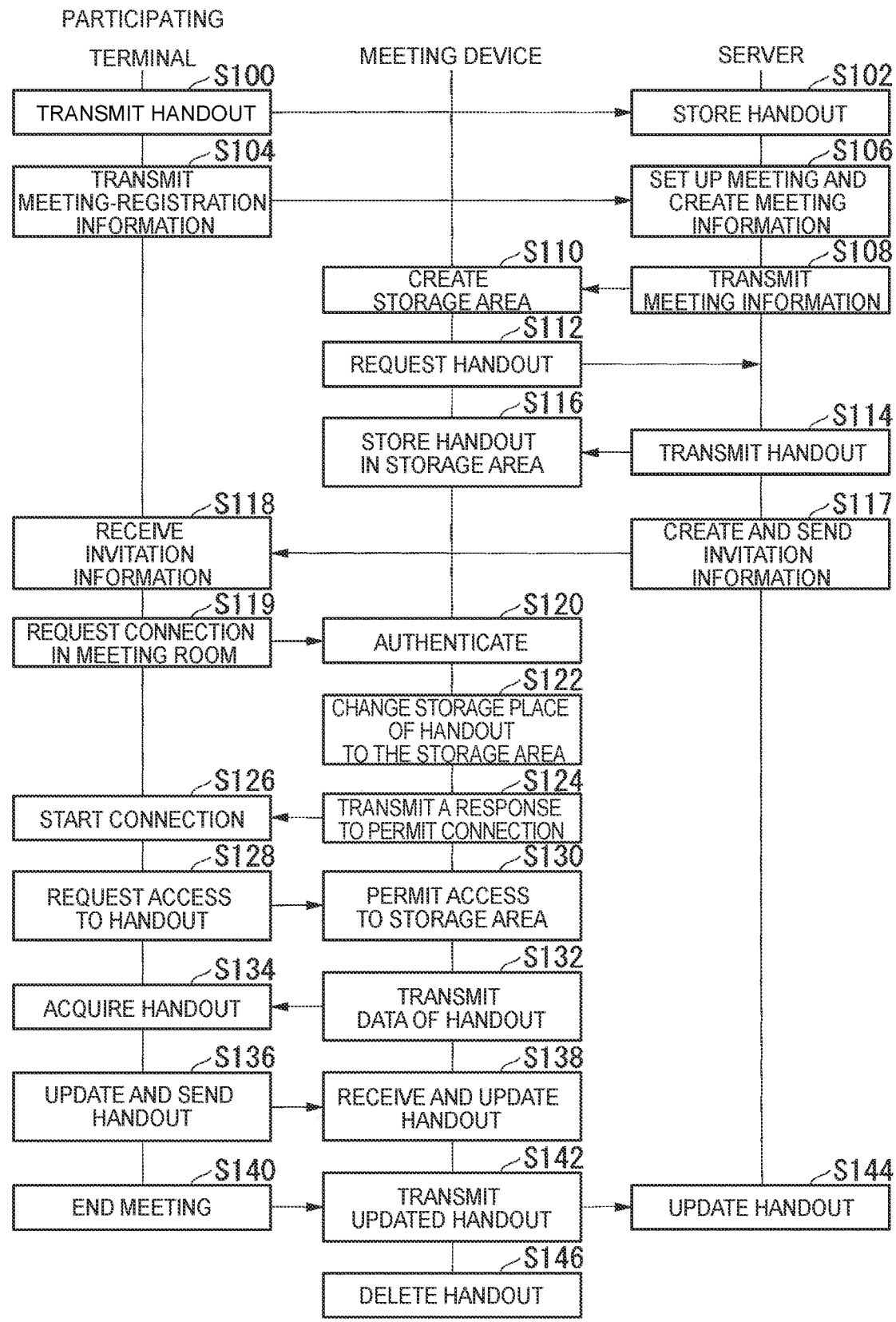
FIG. 9 is a process flow diagram showing one embodiment of a method for processing among a participating terminal, a meeting device and a server for managed updating of meeting handout data.

FIG. 9 is a process flow diagram showing one embodiment of a method 900 for processing among a participating terminal, a meeting device and a server for managed updating of meeting handout data. In accordance with the user's operation, the registration unit 214 in the participating terminal 200 transmits a meeting handout to the server 300 before the meeting (Step S100). The acquisition unit 301 in the server 300 receives data of the meeting handout, and stores the received data in the storage area of the memory unit 320 corresponding to the folder for the meeting (Step S102).

In accordance with the user's operation with the meeting-registration image IM1, the registration unit 214 in the participating terminal 200 transmits meeting-registration information to the server 300 (Step S104). The acquisition unit 301 in the server 300 receives the meeting-registration information, and the setting unit 302 sets up a meeting in accordance with the meeting-registration information and creates meeting information G (Step S106).

The setting unit 302 in the server 300 transmits the meeting information G to the meeting device 100 (Step S108). The acquisition unit 102 in the meeting device 100 acquires the meeting information G, and the management unit 104 reserves a resource (storage area) for the meeting in the memory unit 120 to store the meeting handout in accordance with the meeting information G (Step S110).

The acquisition unit 102 in the meeting device 100 refers to the meeting information G and requests the meeting handout to be used in the meeting from the server 300 predetermined time before the meeting (Step S112). At this time, the management unit 104 transmits the information on the URL of the created storage area to the server 300.

The management unit 306 in the server 300 transmits the meeting handout to the URL of the storage area in response to a request for the meeting handout from the acquisition unit 102 (Step S114). The acquisition unit 102 in the meeting device 100 stores the data of the meeting handout in the storage area (Step S116).

The invitation unit 304 in the server 300 creates invitation information in accordance with the meeting information G, and transmits the invitation information to each participating terminal 200 (Step S117). The acquisition unit 215 in each participating terminal 200 receives the invitation information (Step S118).

At the date and time of the meeting, the user of the participating terminal 200 in the meeting room M clicks the operating button B2 on the meeting information image IM2. Then in accordance with the information transmitted in response to such a clicking operation, the acquisition unit 215 of the participating terminal 200 requests a connection to the meeting device 100 (Step S119). The authentication unit 106 in the meeting device 100 authenticates the participating terminal 200 based on the ID and the password of the participant that are transmitted in association with the clicking operation with the operating button B2 (Step S120).

When receiving the request for a connection to the meeting device 100 from the participating terminal 200 in the meeting room M and authenticating the participating terminal 200, the management unit 104 in the meeting device 100 changes the storage place of the meeting handout from the URL in the server 300 to the URL of the storage area created in the memory unit 120 (Step S122).

After authenticating the participating terminal 200, the authentication unit 106 in the meeting device 100 transmits a response to the participating terminal 200 to permit a connection (Step S124). After the acquisition unit 215 in the participating terminal 200 receives the response, the communication control unit 212 controls the communication unit 206 to start a connection with the meeting device 100 via wireless LAN (Step S126).

The acquisition unit 215 in the participating terminal 200 requests an access to the meeting handout stored in the storage area of the meeting device 100 (Step S128). The management unit 104 in the meeting device 100 permits the participating terminal 200 to access the meeting handout (Step S130).

The management unit 104 in the meeting device 100 makes the communication control unit 108 transmit the data of the meeting handout to the participating terminal 200 (Step S132). The acquisition unit 215 in the participating terminal 200 acquires the meeting handout (Step S134). The registration unit 214 in the participating terminal 200 transmits the updated meeting handout to the meeting device 100 (Step S136).

The acquisition unit 102 in the meeting device 100 acquires the updated meeting handout and replaces the meeting handout stored in the memory unit 120 with the updated meeting handout so as to update the meeting handout (Step S138). After the meeting ends, the registration unit 214 in the participating terminal 200 transmits information indicating the end of the meeting to the meeting device 100 in accordance with the user's operation (Step S140).

After the acquisition unit 102 in the meeting device 100 acquires the information indicating the end of the meeting, the management unit 104 transmits the updated meeting handout to the server 300 (Step S142). The acquisition unit 301 in the server 300 acquires the updated meeting handout and replaces the meeting handout with the meeting handout stored in the memory unit 120 so as to update the meeting handout (Step S144). After that, the meeting device 100 deletes the meeting handout from the storage area (Step S146). After that, the processing of the meeting system 1 ends. The order of these steps as stated above may be changed or another step may be added as needed. For example, the Steps S112, S114, and S116 may be performed after Step S120, and these steps may be optionally added after Step S132 in accordance with the user's operation.

[Process Flow]

Figure 10:
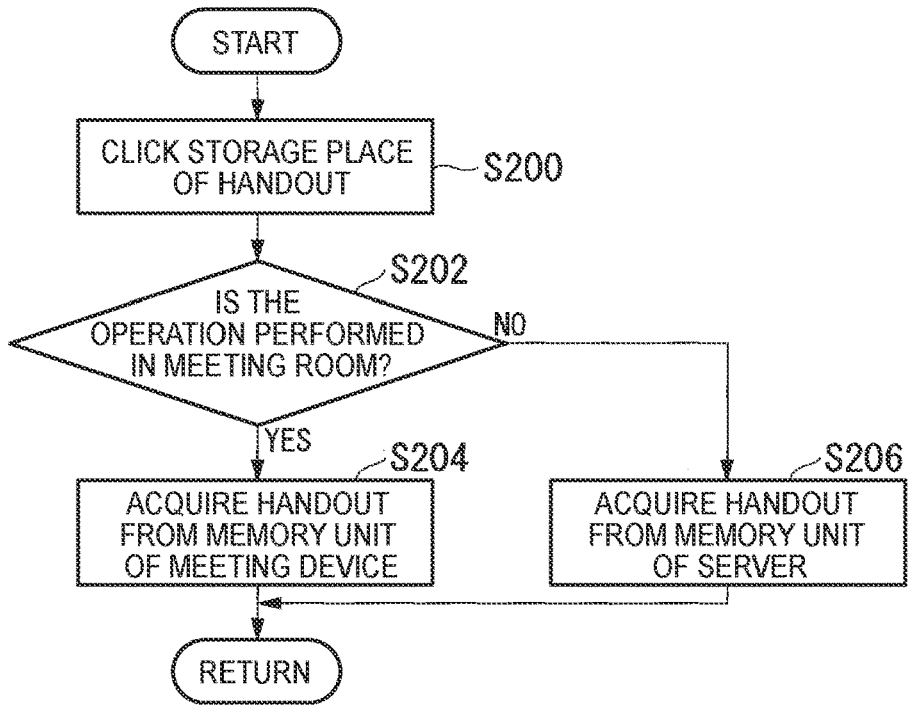
FIG. 10 is a flow diagram illustrating one embodiment of method for a participating terminal to acquire a meeting handout.

FIG. 10 is a flow diagram illustrating one embodiment of method 1000 for a participating terminal to acquire a meeting handout. A user clicks the operating button B1 on the meeting information image IM2 (see FIG. 4) of the participating terminal 200 to display the storage place of the meeting handout. Then the acquisition unit 215 starts the processing to acquire the meeting handout (Step S200). The acquisition unit 215 determines whether the meeting device 100 communicates with the participating terminal 200 or not (Step S202).

If the operation is performed in a meeting room (e.g. Yes at Step S202), the acquisition unit 215 acquires the meeting handout from the storage area corresponding to the meeting in the memory unit 120 of the meeting device 100 (Step S204), otherwise (e.g., No at Step S202, the acquisition unit 215 acquires the meeting handout from the storage area corresponding to the meeting in the memory unit 320 of the server 300 (Step S206). In various embodiments, the participating terminal 200 repeats these steps.

The meeting system 1 in the above embodiment enables sharing of the meeting handout in the meeting, and enables centralized updating of the meeting handout. The meeting system 1 is configured to acquire the meeting handout from the meeting device 100 that communicates with the participating terminal 200 via wireless LAN during the meeting. This configuration can reduce the download time of the meeting handout compared with the download of the data from the server 300 via the network NW.

[Hardware Configuration]

Figure 11:
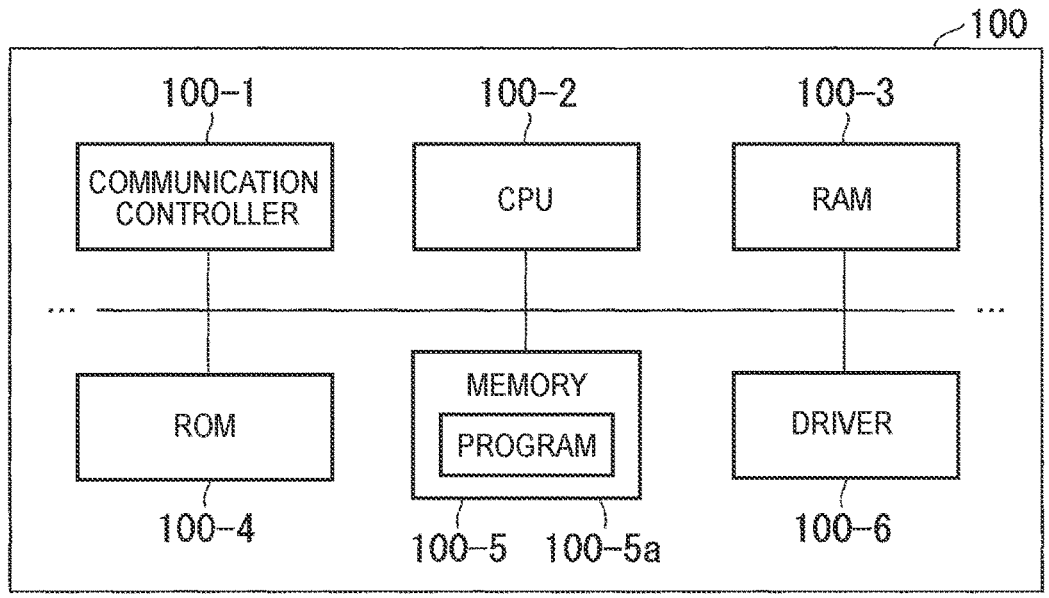
FIG. 11 is a schematic block diagram of one embodiment of a meeting device for managed updating of meeting handout data.

FIG. 11 is a schematic block diagram of one embodiment of a meeting device 100 for managed updating of meeting handout data. As shown in the drawing, the meeting device 100, in one embodiment, includes a communication controller 100-1, a CPU 100-2, a Random Access Memory ("RAM") 100-3 operating as a working memory, a Read Only Memory ("ROM") 100-4 storing a boot program or the like, a memory 100-5, such as a flash memory or a Hard Disk Drive ("HDD"), and a driver 100-6 that are mutually connected via an internal bus or a private communication line. The communication controller 100-1 controls a communication with an element other than the meeting device 100. The memory 100-5 stores a program 100-5a that the CPU 100-2 executes. A DMA (Direct Memory Access) controller (not illustrated), for example, decompresses this program on the RAM 100-3, and the CPU 100-2 executes the program. This implements a part or the entire of the operating unit, the determination unit, and the display control unit.

In one embodiment, a meeting device includes a memory storing a program and a hardware processor. The hardware processor executes a program stored in the memory so as to acquire data of a meeting handout to be used in a meeting and meeting information on the meeting from a server, and store the acquired data and the meeting information in a memory unit, authenticate a participating terminal to participate in the meeting, and after authenticating the participating terminal, change information on a storage place storing the data of the meeting handout from a storage place in the server to a storage area in the memory unit of the meeting device.

In various embodiments, the structures, functions, and other features are practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced with their scope.

What is claimed is:

1. An apparatus comprising:
    a meeting device comprising a processor and a memory unit and configured to be located in a meeting room and to establish a network connection with a server outside of the meeting room;
    an acquisition unit of the meeting device that is configured to acquire from the server, meeting information and meeting handout data for a meeting to be held in the meeting room, and stores the acquired meeting information and the meeting handout data to a storage area in the memory unit of the meeting device;
    an authentication unit of the meeting device that authenticates one or more participating terminals to participate in the meeting; and
    a management unit of the meeting device that, after authenticating the one or more participating terminals, in response to determining that the one or more participating terminals are making a request to acquire the meeting handout data from within the meeting room in which the meeting device is located changes a locator for the meeting handout data that the one or more participating terminals acquire from pointing to a storage place of the server to pointing to the storage area in the memory unit of the meeting device in the meeting room.

2. The apparatus of claim 1, wherein the meeting device serves as an access point of a wireless network in the meeting room to communicate with the one or more participating terminals located in the meeting room.

3. The apparatus of claim 2, wherein the management unit of the meeting device in the meeting room sets a capacity of the storage area in the memory unit of the meeting device in the meeting room in accordance with a size of the meeting handout data.

4. The apparatus of claim 2, wherein the acquisition unit stores the meeting handout data acquired from the storage place of the server outside the meeting room to the storage area in the memory unit of the meeting device in the meeting room.

5. The apparatus of claim 2, wherein the acquisition unit of the meeting device in the meeting room stores the meeting handout data acquired from the server outside of the meeting room in the storage area in the memory unit at a predetermined time before a starting time of the meeting of the meeting device in the meeting room.

6. The apparatus of claim 2, wherein the-acquisition unit of the meeting device in the meeting room stores the meeting handout data acquired from server outside of the meeting room to the storage area in the memory unit of the meeting device in the meeting room after a starting time of the meeting, and wherein the meeting device in the meeting room is configured to allow updates to the meeting handout data stored in the meeting device located in the meeting room to be made based at least in part on information communicated verbally in the meeting room during the meeting.

7. The apparatus of claim 1, wherein the meeting device is configured to disallow updates to the meeting handout data stored in the meeting device located in the meeting room to be made by terminals that are not located in the meeting room during the meeting.

8. The apparatus of claim 1, wherein the management unit of the meeting device in the meeting room transmits updated meeting handout data that is updated in the memory unit of the meeting device in the meeting room during the meeting to the server outside of the meeting room.

9. The apparatus of claim 1, wherein the management unit updates the meeting handout data stored in a predetermined storage area of the server outside of the meeting room based on meeting handout data that is updated in the memory unit of the meeting device in the meeting room.

10. The apparatus of claim 1, wherein the management unit of the meeting device in the meeting room deletes the meeting handout data from the memory unit of the meeting device in the meeting room, in response to the meeting ending.

11. A method comprising:
acquiring from a server outside of a meeting room, meeting information and meeting handout data for a meeting scheduled to be held in the meeting room;
storing the acquired meeting information and meeting handout data to a storage area in a memory unit of a meeting device located in the meeting room;
determining whether a participating terminal requesting connection to the meeting device is also located in the meeting room and authenticating a participating terminal to participate in the meeting; and
changing, after authenticating the participating terminal and in response to determining that the participating terminal requesting connection to the meeting device is also located in the meeting room, a locator for the meeting handout data from a storage place of the server outside the meeting room to the storage area in the memory unit of the memory device located in the meeting room.

12. The method of claim 11, further comprising reserving, prior to the participating terminal being authenticated, sufficient storage area in the memory unit of the meeting device located in the meeting room to store the meeting handout data based on the meeting information.

13. The method of claim 12, further comprising storing the meeting handout data acquired from the server outside the meeting room to the storage area in the memory unit of the meeting device located in the meeting room.

14. The method of claim 12, further comprising storing the meeting handout data acquired from the server outside the meeting to in the storage area in the memory unit of the meeting device located in the meeting room at a predetermined time before a starting time of the meeting.

15. The method of claim 12, further comprising:
storing the meeting handout data acquired from the server in the storage area in the memory unit of the meeting device located in the meeting room after a starting time of the meeting; and
making updates to the meeting handout data stored in the meeting device located in the meeting room based at least in part on information communicated verbally in the meeting room during the meeting.

16. The method of claim 12, further comprising deleting the meeting handout data from the memory unit of the meeting device located in the meeting room, in response to the meeting ending.

17. The method of claim 11, further comprising creating a schedule for downloading the meeting handout data sufficient to enable the downloading to be performed by a starting time of the meeting.

18. The method of claim 11, further comprising:
updating, during the meeting, the meeting handout data stored to the storage area in the memory unit to produce updated meeting handout data; and
transmitting the updated meeting handout data to the server.

19. The method of claim 11, further comprising communicating updated meeting handout data to be stored in a predetermined storage area of the server outside the meeting room based on updates made during the meeting to the meeting handout data in the storage area of the memory unit of the meeting device located in the meeting room, the updates being made by one or more participating terminals located in the meeting room and connected to the meeting device in the meeting room during the meeting.

20. A system comprising:
a participating terminal configured to participate in a meeting held in a meeting room;
a server outside the meeting room that stores meeting handout data to be used in the meeting held in the meeting room; and
a meeting device configured to be located in the meeting room and to:
acquire meeting information and the meeting handout data from the server outside the meeting room;
store the acquired meeting information and meeting handout data in a storage area of a memory unit of the meeting device located in the meeting room;
authenticate the participating terminal and determine whether the participating terminal requesting connection to the meeting device is located in the meeting room; and
after authenticating the participating terminal, change a locator for the meeting handout data from a storage place of the server to the storage area in the memory unit in response to determining that the participating terminal requesting connection to the meeting device is located in the meeting room.

* * * * *